(12) United States Patent
Lee

(10) Patent No.: US 9,573,471 B2
(45) Date of Patent: Feb. 21, 2017

(54) TERMINAL, VEHICLE HAVING THE SAME, AND CONTROL METHOD THEREOF

(71) Applicant: Hyundai Motor Company, Seoul (KR)

(72) Inventor: Tae Ho Lee, Goyang (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/523,900

(22) Filed: Oct. 26, 2014

(65) Prior Publication Data

US 2015/0158500 A1    Jun. 11, 2015

(51) Int. Cl.
  *B60K 37/06* (2006.01)
  *G06F 3/01* (2006.01)
(52) U.S. Cl.
  CPC ............... *B60K 37/06* (2013.01); *G06F 3/017* (2013.01); *B60K 2350/1052* (2013.01); *B60K 2350/2013* (2013.01)
(58) Field of Classification Search
  CPC .. B60W 50/08; B60W 50/085; B60W 50/087; B60W 50/10; B60W 50/14; B60W 50/146
  See application file for complete search history.

(56) References Cited

U.S. PATENT DOCUMENTS

| | | | | |
|---|---|---|---|---|
| 7,653,508 B1* | 1/2010 | Kahn | ............... | G01C 22/006 33/700 |
| 8,854,335 B2* | 10/2014 | Chang | ............... | G06F 3/0412 345/158 |
| 2004/0141634 A1* | 7/2004 | Yamamoto | ............... | B60K 37/06 382/104 |
| 2004/0193413 A1* | 9/2004 | Wilson | ............... | G06F 3/017 704/243 |
| 2004/0246124 A1* | 12/2004 | Reilly | ............... | G01S 13/56 340/511 |
| 2005/0025345 A1* | 2/2005 | Ohta | ............... | B60H 1/0065 382/116 |
| 2009/0063088 A1* | 3/2009 | Chen | ............... | A61B 5/02055 702/141 |
| 2009/0195166 A1* | 8/2009 | Chen | ............... | H05B 33/0863 315/158 |
| 2009/0327977 A1* | 12/2009 | Bachfischer | ............... | B60K 35/00 715/863 |

(Continued)

FOREIGN PATENT DOCUMENTS

| JP | 2001-216069 | 8/2001 |
|---|---|---|
| JP | 2005-178473 | 7/2005 |

(Continued)

*Primary Examiner* — Jerrah Edwards
*Assistant Examiner* — Tamara Weber
(74) *Attorney, Agent, or Firm* — Mintz Levin Cohn Ferris Glovsky and Popeo, P.C.; Peter F. Corless

(57) ABSTRACT

An apparatus is provided that includes a terminal, a detection unit configured to detect movement of a user, and a control unit to control operation of the terminal so that operation and functions corresponding to a number of times the movement is detected. Accordingly, it may be possible to intuitively input operation instructions of the terminal, give cognition of the intuitive and sensuous terminal to the user since the operation instructions of the terminal are input in an input manner by operation struck with a hand two or three times such as clicking or double clicking.

14 Claims, 9 Drawing Sheets

(56) References Cited

U.S. PATENT DOCUMENTS

| | | | |
|---|---|---|---|
| 2010/0160834 A1* | 6/2010 | Fong | A61B 5/1118 600/595 |
| 2011/0289456 A1* | 11/2011 | Reville | G06F 3/017 715/830 |
| 2012/0209474 A1* | 8/2012 | Morris | B62D 1/046 701/42 |
| 2013/0090807 A1* | 4/2013 | Kojima | B60K 37/06 701/36 |
| 2013/0162530 A1* | 6/2013 | Takahashi | G06F 3/0304 345/157 |
| 2014/0172231 A1* | 6/2014 | Terada | G06F 3/005 701/36 |
| 2015/0066245 A1* | 3/2015 | Lee | B60W 50/10 701/2 |

FOREIGN PATENT DOCUMENTS

| | | |
|---|---|---|
| JP | 2007-283968 A | 11/2007 |
| KR | 2011-0054672 | 5/2011 |
| KR | 10-2012-0048190 A | 5/2012 |
| KR | 2012-0138126 | 12/2012 |

\* cited by examiner

TERMINAL, VEHICLE HAVING THE SAME, AND CONTROL METHOD THEREOF

CROSS-REFERENCE TO RELATED APPLICATION

This application claims the benefit of Korean Patent Application No. 2013-0153555, filed on Dec. 11, 2013 in the Korean Intellectual Property Office, the disclosure of which is incorporated herein by reference.

BACKGROUND

1. Field

Embodiments of the present invention relate to a terminal to easily input operation instructions, a vehicle having the same, and a control method thereof.

2. Description of the Related Art

A/V (Audio/Video) devices are often used in vehicles to improve the convenience of a driver during vehicle operation. Typically, A/V devices consist of a radio, a cassette/compact disc player, a video player, and a navigation device. The terminal has a display unit which displays information via an image or video.

Navigation devices which are incorporated into the A/V devices typically analyze and interpret information such as speed information, position information, and travel range information of the vehicle using a positioning system such as a Global Positioning System (GPS) and a digital map in order to provide a driver with directions based on the above said information.

Typically, a passenger in the vehicle may operate the terminal such as the navigation device by a remote device or a button input method. Regardless, the passenger is able to identify the current operational state of each device in the vehicle via the terminal and input operational instructions through the display unit thereof.

Terminals such as A/V devices are now being manufactured as a touch screen so that the input unit may be conveniently operated by the user without hindering the drivers operating abilities. Such a terminal typically has a menu activation button image displayed on the display unit.

As such, the user is able to change the operational state of the terminal by touching the menu activation button image displayed on the display unit. In this case, information corresponding to the changed operational condition is displayed on the display unit of the terminal.

Moreover, a terminal such as the A/V device further may include a physical button inputs which are installed to both sides of the display unit in order to rapidly move to a specific menu without having to move through the touch screen selections. If the physical button inputs are installed on the terminal, however, the display unit is decreased in size in order to fit the terminal in the designated space within the dash of the vehicle and thus it may be difficult for the user to identify/see information displayed on the display unit while driving.

In addition, if the physical button inputs are installed on the terminal, there is needs for a PCB (printed circuit board) corresponding to each of the physical button inputs, a button lighting LED (light emitting diode) for identification of a physical button input at night, and a button mechanism. This creates an increase in manufacturing cost of the terminal which is often passed on to the consumer.

SUMMARY

Therefore, it is an aspect of the present invention to provide a terminal which detects movement of a user's hand and performs a given operation by identifying operation instructions corresponding to the number of times a detected movement is detected, a vehicle having the same, and a control method thereof It is another aspect of the present invention to provide a terminal which detects movement of a user's hand and performs a given operation by identifying operation instructions corresponding to detection times of the detected movement, a vehicle having the same, and a control method thereof.

Additional aspects of the invention will be set forth in part in the description which follows and, in part, will be obvious from the description, or may be learned by practice of the invention.

In accordance with one aspect of the present invention, a vehicle includes a terminal, a detection unit configured to detect movement of a user, and a control unit (including a specifically designated processor and memory) configured to control operation of the terminal such that operation and functions correspond to a number of times a detected movement is performed on or around (e.g., a surface of) the terminal.

In some exemplary embodiments of the present invention, a terminal may be embodied as a navigation device, a black box, a GPS, a Bluetooth device, or a rear camera display.

Additionally, the detection unit may include a proximity sensor is configured to detect movement of a hand located in a predetermined detection region.

The control unit may activate a redetection mode when the movement is detected, and maintain the redetection mode thereafter. Additionally, when the movement is redetected within a preset certain period of time while the redetection mode is activated, the control unit may count the number of times the movement is redetected, and terminate the redetection mode once the movement is not redetected within the certain period of time.

As such, in some exemplary embodiments of the present invention, the control unit may count the number of times of the movement is detected for a preset reference time from a point in time at which the movement is initially detected.

The vehicle may further include an input unit to set operation instructions according to the number of times the movement is performed, and the control unit may activate the detection unit when key signals to set the operation instructions are input. Additionally, the number of times of the movement detected by the detection unit may be matched with the operation instructions input to the input unit to generate operation instructions according to the number of times the movement is performed by the user.

The vehicle or terminal itself may further include a storage unit (e.g., memory or hard drive) which stores the operation instructions according to the number of times of a movement performed/detected.

In accordance with another aspect of the present invention, a terminal which performs at least one of a vehicle driving route guidance operation mode, an external broadcasting output operation mode, and an A/V output operation mode, may be configured to include a detection unit configured to detect movement of a user, a control unit configured to identify operational instructions corresponding to the number of times the movement is detected and control the operation mode based on the identified operation instructions. Additionally, the vehicle or the terminal may include a storage unit that stores the operation instructions corresponding to the number of times the movement is detected.

As such, the control unit may convert a current operation mode into another operation mode based on the number of times the movement is detected.

For example, the control unit may perform either a screen capture operation, a channel storage operation, or menu expansion and reduction operation in a current mode, based on the number of times the movement is detected.

The detection unit may include or be embodied as a proximity sensor which detects movement of a hand located in a predetermined detection region in front or on a terminal display.

The control unit may enter a redetection mode when once movement is detected and maintain the redetection mode thereafter. Then once the movement is redetected within a certain time period during performance of the redetection mode, the number of times of the movement is redetected is counted. Once the movement is not redetected within the certain time, the redetection mode is terminated.

As such, the control unit may, for example, count the number of times the movement is detected within a preset period of time from a point in time at which the movement is initially detected.

The control unit may further be configured to identify a detection time at which the movement is detected within a preset detection region and identify an operation instruction corresponding to the identified detection time.

Alternatively or in combination with the above time identification, the control unit may be configured to identify a detection direction of the movement when the movement is detected within a preset detection region and identify an operation instruction corresponding to the identified detection direction.

In accordance with a further aspect of the present invention, a method of controlling a terminal provided in a vehicle, includes activating a detection unit when an instruction to perform a detection mode is input to an input unit, identifying, when movement is detected by the detection unit, the number of times of the movement is detected, identifying operation instructions corresponding to the number of times the movement is detected, and controlling operation of the terminal based on the identified operation instructions.

In particular, detecting the movement may include determining the movement detected within a preset detection region among the movements detected by the detection unit is a movement associated with an operation instruction.

Furthermore, identifying the number of times of the movement is detected may include entering a redetection mode when the movement is detected, and determining whether the movement is redetected within a preset certain time period and repeating a process of additionally counting the number of times of the movement is redetected when the movement is redetected prior to expiration of the certain time. Conversely, when the movement is not redetected within the certain time, the redetection mode may be terminated.

Identifying the number of times of the movement is detected may include counting the number of times of the movement is detected for a preset reference time period from a point of time at which the movement is initially detected until the time period elapses, and identifying an operation instruction which is associated with the number of times the counted movement for the reference time is redetected.

The method may further include activating the detection unit when key signals to set operation instructions are input to the input unit, identifying the operation instructions input to the input unit, identifying the number of times of the movement is detected by the detection unit, generating a new operation instruction by matching the number of times of the identified movement with the operation instructions input to the input unit, and storing the generated new operation instruction and the number of times of the movement.

The identifying movement detected by the detection unit may further include identifying the number of times of the movement is detected by the detection unit and a time interval between the detected movements.

The identifying movement detected by the detection unit may also include identifying a reference time input to the input unit, and identifying the number of times of the movement is detected by the detection unit during the reference time period.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
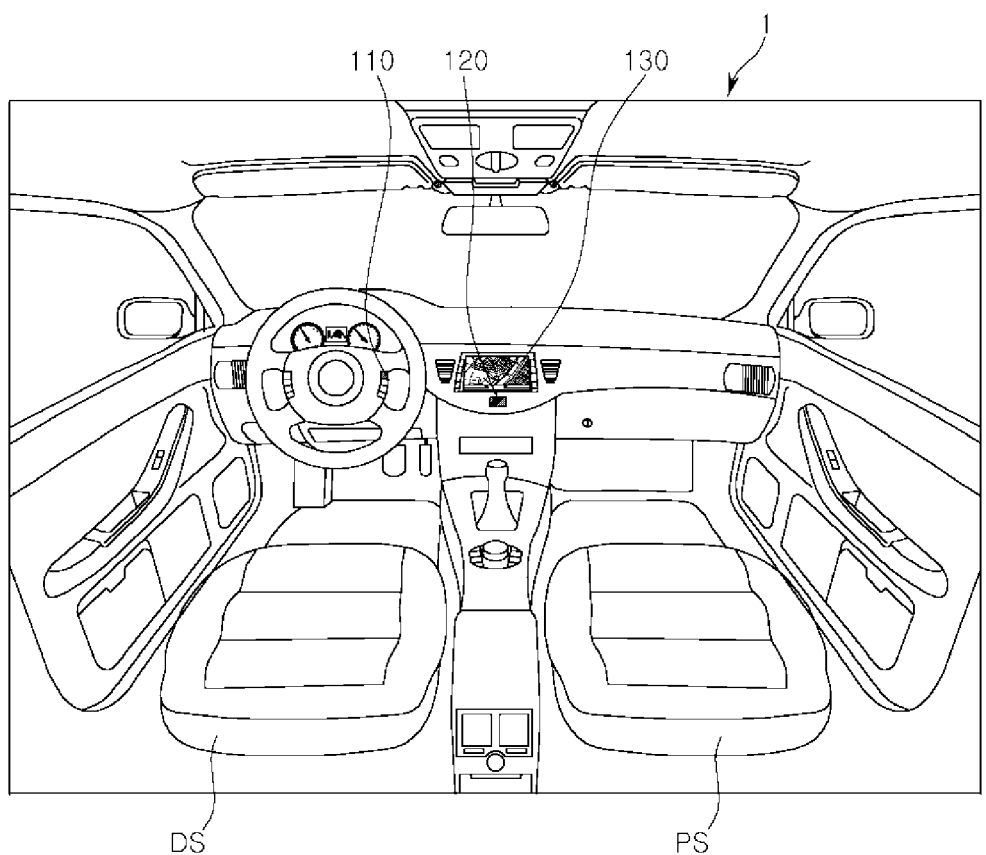
FIG. 1 is an exemplified view illustrating a vehicle provided with a terminal according to an exemplary embodiment of the present invention.

Reference will now be made in detail to the embodiments of the present invention, examples of which are illustrated in the accompanying drawings, wherein like reference numerals refer to like elements throughout.

Additionally, it is understood that the below methods are executed by at least one control unit. The term control unit refers to a specifically defined hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

FIG. 1 is an exemplified view illustrating a vehicle provided with a terminal according to an exemplary embodiment. A vehicle 1 is an apparatus configured and designed move on a road by rotational movement of vehicle wheels for the purpose of transporting persons or cargo. The vehicle 1 includes a body having interior and exterior parts, and a chassis which is a remaining portion thereof and is equipped with mechanisms required for driving thereof. The exterior part of the body may include and typically includes a front panel, a bonnet, a roof panel, a rear panel, a trunk, and front-rear and left-right doors.

The exterior part of the body may further include pillars provided on boundaries between the front panel, the bonnet, the roof panel, the rear panel, the trunk, and the front-rear and left-right doors. In addition, the exterior part of the body further includes side window glass installed on the front-rear and left-right doors, quarter window glass which is installed between the pillars and the other pillars so as not to be openable and closable, a rear window glass installed to the rear, and a front window glass installed to the front.

The interior part of the body may include seats on which a driver/passenger(s) is/are seated, a dashboard, and instrument panels 210. The instrument panels 210 may include a speedometer, a fuel gauge, an automatic transmission shift indicator, a tachometer, and a mileage indicator, which are arranged on the dashboard to output information related to driving. Also included in the interior is a steering wheel that is used to operate a vehicle driving direction, a center fascia having an adjustment board for an audio device and an air conditioner. Additional parts and components may be included without departing from the overall spirit of the invention. For example, the seats may include a driver seat DS for a driver, a passenger seat PS for a fellow passenger, and a rear seat arranged in the rear of the vehicle.

The center fascia may be a control panel disposed between the driver seat and the passenger seat in the dashboard of the vehicle, and may be equipped with an operation unit to adjust an audio/video device, an air conditioner, and a heater, a blowing port, a cigar jack, etc.

The chassis of the vehicle may include a power generator, a power transfer device, a driving device, a steering device, a brake system, a suspension system, a transmission, a fuel system, front-rear and left-right wheels, etc.

Furthermore, the vehicle may be provided with various safety systems for safety of the driver and passenger. Here, the safety systems of the vehicle include an airbag control device for the purpose of safety of the driver and passenger, an ESC (Electronic Stability Control) to control posture of the vehicle during acceleration or cornering thereof, etc. In addition, the vehicle is further equipped with terminals such as a navigation device, a hands-free device, a GPS, an audio device, and a Bluetooth device, and a terminal 130 such as a rear camera.

Additionally, the vehicle 1 may further include an operation unit 110 by which an input mode for input of an operation instruction input to the terminal 130 is set to or released from a detection mode, and a detection unit 120 (alternatively referred to herein as a "detector") which detects movement of the user when the input mode is set to the detection mode.

More specifically, the operation unit 110 may be implemented by a button method. As such, the operation unit 110 may be disposed on the center fascia of the dashboard or the steering wheel and receives an ON/OFF instruction of the detection mode for detection of movement of the user.

The detection unit 120 may be activated or deactivated based on the instruction of the terminal 130. The detection unit 120 detects movement of a hand, which is close to or comes into contact with the terminal during activation thereof, and generates detection signals to transmit the same to the terminal 130. As such, the detection unit 120 may include one or more proximity sensors such as an infrared sensor, a capacitive sensor, an ultrasonic sensor, and/or a photo sensor.

The detection unit 120 may also be utilized when the user inputs operation ON/OFF instructions and function changing instructions of the navigation device, hands-free device, GPS, audio device, and Bluetooth device, when the user inputs operation instructions of the air conditioner and heater, or when the user inputs an instruction for driving of the vehicle. Here, the operation unit 110 and the detection unit 120 may be disposed in the vicinity of the terminal 130.

Alternatively, the operation unit 110 and the detection unit 120 may also be disposed in the vicinity of the driver seat for operation convenience of the driver, or may also be disposed in the vicinity of the passenger seat so as to be operated by the fellow passenger. In addition, the operation unit 110 and the detection unit 120 may also be disposed in the vicinity of the rear seat. Moreover, the operation unit 110 and the detection unit 120 may be provided in as a plurality. In this case, the operation units and the detection units may be disposed in the vicinity of the driver seat, passenger seat, and rear seat. In addition, the operation unit 110 and the detection unit 120 may also be installed at positions adjacent to or different from each other. Also, the operation unit 110 may also be disposed in the form of an input part inside the terminal and the detection unit 120 may also be disposed on the dashboard outside the terminal.

Figure 2:
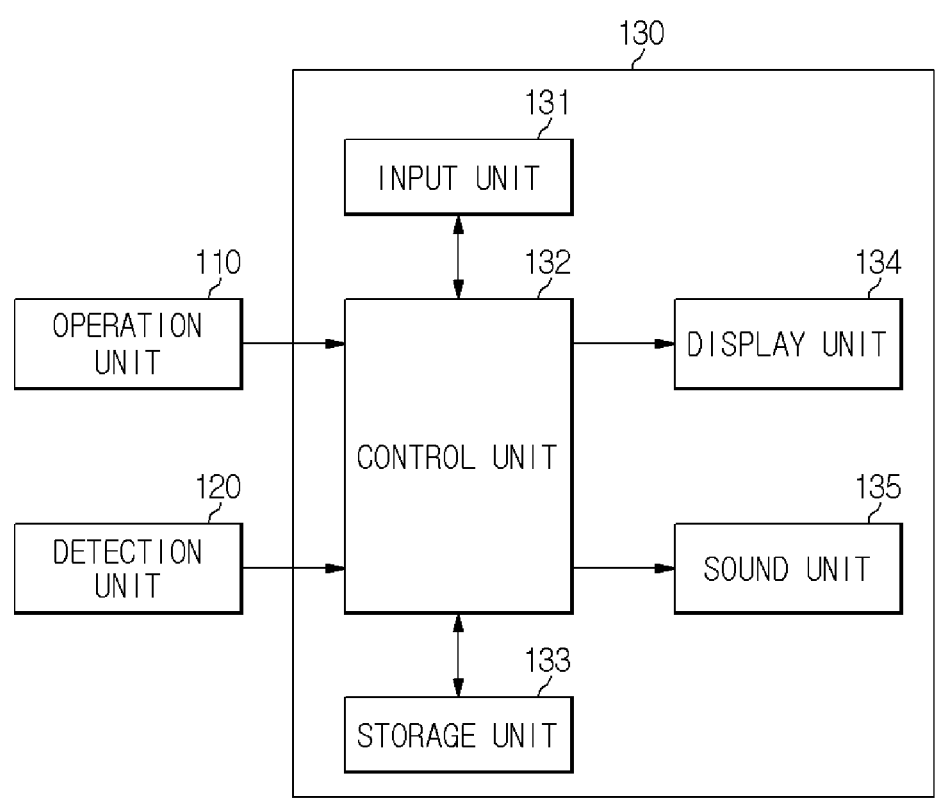
FIG. 2 is a view illustrating a control configuration of the terminal in the vehicle according to the exemplary embodiment of the present invention.

FIG. 2 is a view illustrating a control configuration of the terminal in the vehicle according to the exemplary embodiment. The terminal 130 includes an input unit 131, a control unit 132 (alternatively referred to herein as a "controller"), a storage unit 133, a display unit 134, and a sound unit 135.

The terminal 130 may be one of the navigation device, the hands-free device, the A/V device, the Bluetooth device, and/or the rear camera, or may be one device to perform operation modes such as vehicle driving guidance, external broadcasting output, and A/V output.

The input unit 131 may be a plurality of keys (not shown) provided on a main body of the terminal 130 and a touch panel (not shown) provided on the display unit 134. The input unit 131 receives operation instructions from the user through one of input of the plurality of keys and touch input of the touch panel and transmits signals corresponding to the received operation instructions to the control unit 132. The input unit 131 further includes an operation instruction setting key for generation of operation instructions corresponding to the number of times a particular movement is detected.

When the operation instruction setting key is input, the input unit 131 may transmit an input signal of the operation instruction setting key to the control unit 132, and receive an operation instruction to be set and the number of times the movement is detected so as to transmit signals in response to the received operation instruction and number of times the movement is detected to the control unit 132. Here, the number of times the movement is detected may also be directly detected through the detection unit 120.

When an instruction for performance of the detection mode is input, the control unit 132 converts the input mode into the detection mode and controls activation of the detection unit 120. When an operation signal of the operation unit 110 is input during performance of the detection mode, the control unit 132 releases the converted detection mode from the input mode and controls deactivation of the detection unit 120.

Moreover, the control unit 132 receives an operation instruction of the terminal through the key input or touch input of the input unit 131 during deactivation of the detection unit 120. The control unit 132 determines only a signal detected within a predetermined detection region among the signals transmitted from the detection unit 120 as a signal indicative of movement. Here, the signal within the detection region may be identified by the magnitude of the input signal.

When the movement is detected by the activated detection unit 120, the control unit 132 performs a redetection mode, and the control unit 132 activates a timer to determine whether the movement is redetected within a preset certain time. When the movement is redetected within the certain time, the control unit 132 maintains the detection unit in a standby mode to detect whether movement is additionally present while counting the number of times the movement is detected, and repeats a process of recounting for a certain period of time. When the movement is not redetected within the certain time, the redetection mode is terminated by the control unit 132.

The control unit 132 identifies operation instructions corresponding to the number of times of the detected movement during the redetection mode and controls driving of the display unit 134 and sound unit 135 based on the identified operation instructions. For example, the control unit 132 changes the current function or controls an ON/OFF function of the operation. Moreover, the initially detected movement may also be reflected in the total number of times the movement is detected and be excluded therefrom.

When the operation instruction setting key is input to the input unit 131, the control unit 132 may perform an operation instruction setting mode and generate a new operation instruction by matching the operation instructions input to the input unit 131 with the number of times the movement is input to the input unit 131.

In addition, when the operation instruction setting key is input to the input unit 131, the control unit 132 may also perform the operation instruction setting mode, activate the detection unit 120, and generate a new operation instruction by matching the operation instructions input to the input unit 131 with the number of times the movement is detected by the detection unit 120.

In this case, the control unit 132 stores the number of times the movement detected and a time between the movements detected by the detection unit 120. In addition, the time between the movements being detected may be a preset certain time period. Furthermore, when the number of times the movement is detected may be detected a plurality of times, the time between the movements may also be a time period that is calculated by averaging the plurality times between the movements.

The storage unit 133 may be configured to store the operation instructions corresponding to the number of times the movement is detected. The storage unit 133 stores data for a certain time period until next movement is detected during the redetection mode. Here, the certain time period is a time in which it is clear that the movement was not intended to control operation the terminal and therefore the redetection mode should be terminated.

The display unit 134 may display information related to a telephone call, information related to playing of music, or map information related to driving and route guidance information, or may also display external broadcasting signals as an image. Furthermore, the sound unit 135 outputs sound related to route and driving information, music, and images.

Figure 3:
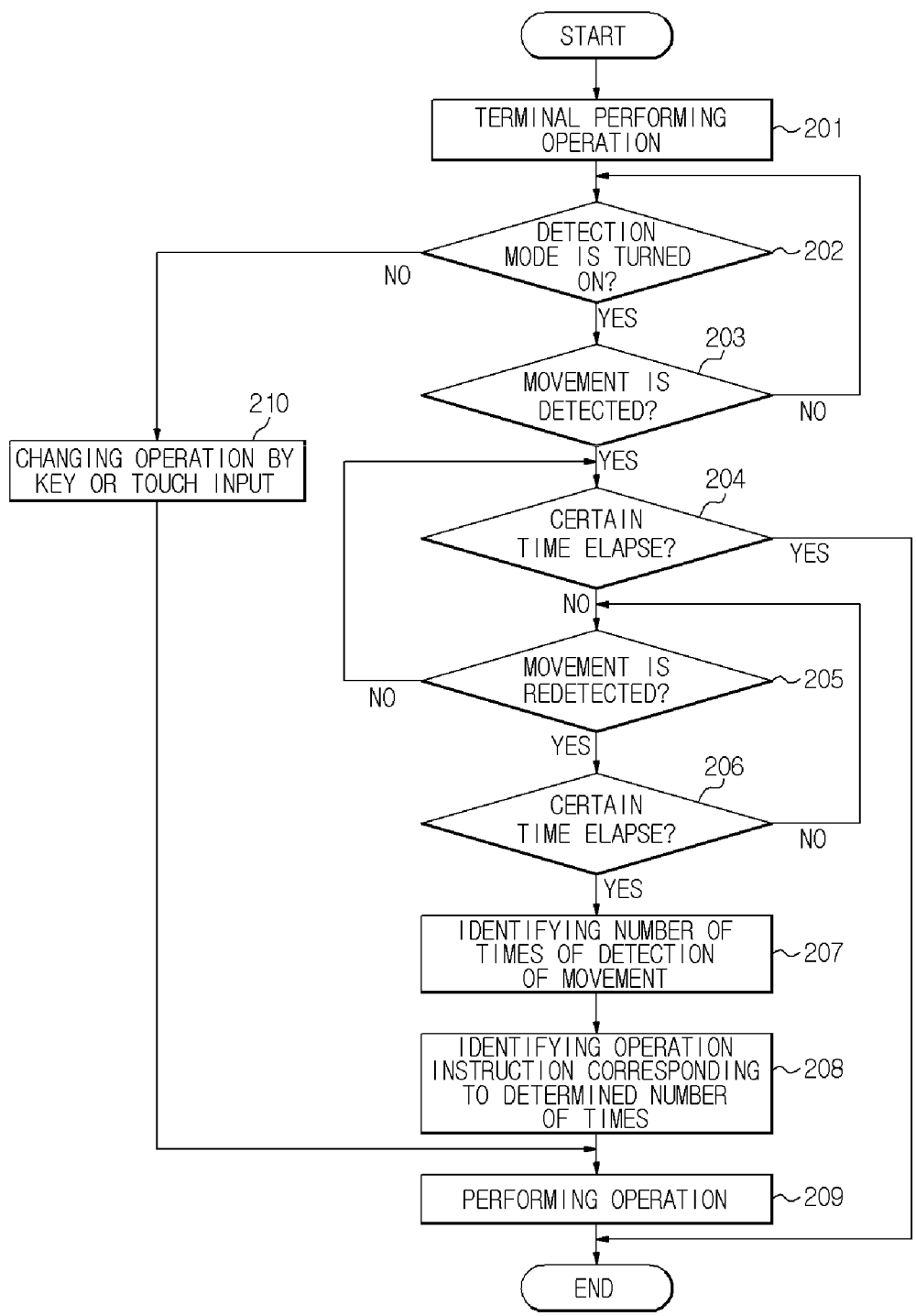
FIG. 3 is a control flowchart of the terminal in the vehicle according to the exemplary embodiment of the present invention.
Figure 4:
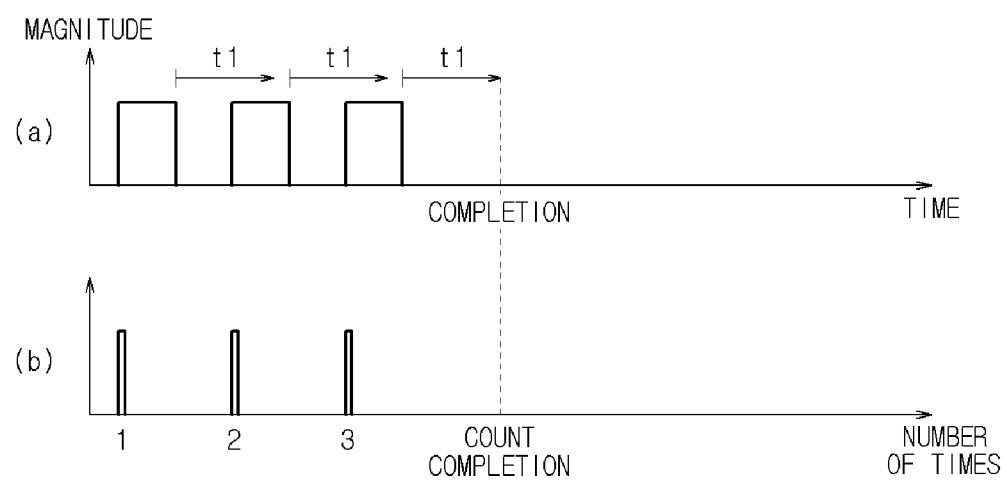
FIG. 4 is an exemplified view illustrating a count of movement of the terminal in the vehicle according to the exemplary embodiment of the present invention.

FIG. 3 is a control flowchart of the terminal in the vehicle according to the exemplary embodiment. Hereinafter, a description will be given with reference to FIG. 4. When it is determined that the detection mode is turned ON in the operation unit 110 (operation 202) while the terminal performs any one of operations in a powered state (operation 201), the terminal performs the detection mode which receives an operation instruction to control at least one of plurality of operation modes through detection of a hand's movement.

The terminal transmits an activation signal to the detection unit 120. In this case, the detection unit 120 receives the activation signal from the terminal and activates the operation. When a hand close to the terminal is detected, the terminal outputs a high signal equal to or greater than a certain magnitude. On the other hand, when the hand close to the terminal is not detected, the terminal outputs a low signal.

In addition, the low signal may also be output when the hand is detected whereas the high signal may also be output when the hand is not detected, according to a circuit configuration of processing detection signals of the detection unit. As such, the present invention is not limited to any signal output convention.

When the hand's movement is detected by the detection unit 120 (operation 203), the terminal activates the redetection mode. Here, the redetection mode is a mode initiates a timer to determine whether the timer has reached a certain time (operation 204) and whether the hand's movement has been redetected within the certain time period (operation 205).

As shown in FIG. 4(a), determining whether the hand's movement is detected or redetected means that the hand is determined to be close to a predetermined detection region when the high signal equal to or greater than a certain magnitude is input from the detection unit 120 whereas the hand is determined to be away from the detection region when the low signal is input from the detection unit 120, for example. In this case, the terminal determines that the hand is moving inward and outward from the detection region based on the high and low signals input from the detection unit.

Such a terminal activates a timer from a point in time at which the low signal is input from the detection unit 120 when the hand is away from the detection region. As shown in FIG. 4(b), when the hand's movement is redetected before the timer expires and passes a certain period of time t1, the terminal counts a number of times a movement is detected by adding 1 to the count every time a movement is detected and determines whether the hand's movement is redetected after recounting a time during the redetection mode. Such a terminal repeats the redetection mode until the timer expires.

When it is determined that the timer has reached a certain time t1 (operation 206), the terminal terminates the redetection mode and identifies the number of times of the counted movement until the redetection mode is terminated (operation 207). That is, when the high signal is not input by the time the timer expires (i.e., a certain time t1), the terminal terminates the redetection mode.

Next, the terminal identifies operation instructions corresponding to the number of times movement is detected (operation 208) and performs at least one of load operations of the display unit 134 and sound unit 135 based on the identified operation instructions (operation 209). In addition, when the detection mode is not input through the operation unit 110, the terminal changes the current operation mode corresponding to the key input of the input unit or the touch input of the touch panel (operation 210) and performs the changed operation (operation 209).

As an example of the terminal control, a method of controlling operation modes of the terminal will be described. Here, it is assumed that the terminal has operation modes such as a navigation mode, a radio mode, and a DMB (Digital Multimedia Broadcasting, Mobile TV) viewing mode.

When the terminal performs the navigation operation mode informing vehicle driving information, the terminal changes the navigation operation mode to the DMB operation mode when the movement is detected once and a certain time period elapses, and changes the navigation operation mode to the radio operation mode when the movement is detected twice and a certain time elapses.

As another example of the terminal control, a method of controlling functions of the terminal will be described. Here, it is assumed that the terminal is a navigation device and has functions such as menu expansion, image capture, and sound volume-increase/decrease.

When the terminal performs the navigation operation mode informing vehicle driving information, the terminal may expand and display the menu of the navigation device when a movement is detected once and a certain time elapses, captures the current image displayed on the navigation device when the movement is detected twice and a certain time elapses, and turns the sound volume of the navigation device up when the movement is detected three times and a certain time elapses.

In addition, it is assumed that the terminal is an A/V device capable of viewing the DMB, an operation instruction corresponding to capture is when the movement is executed once, and an operation instruction corresponding to channel change is when the movement is executed twice.

In this case, when the A/V device outputs external broadcasting, the A/V device captures and stores the current output image when the movement is detected once and then a certain time elapses. In addition, when the A/V device outputs external broadcasting, the A/V device turns the current channel up or down to change the channel when the movement is detected twice and then a certain time elapses.

As such, since the operation instructions of the terminal are input by an input method such as clicking or double clicking, it may be possible to give intuitive and sensuous cognition to the user.

Figure 5:
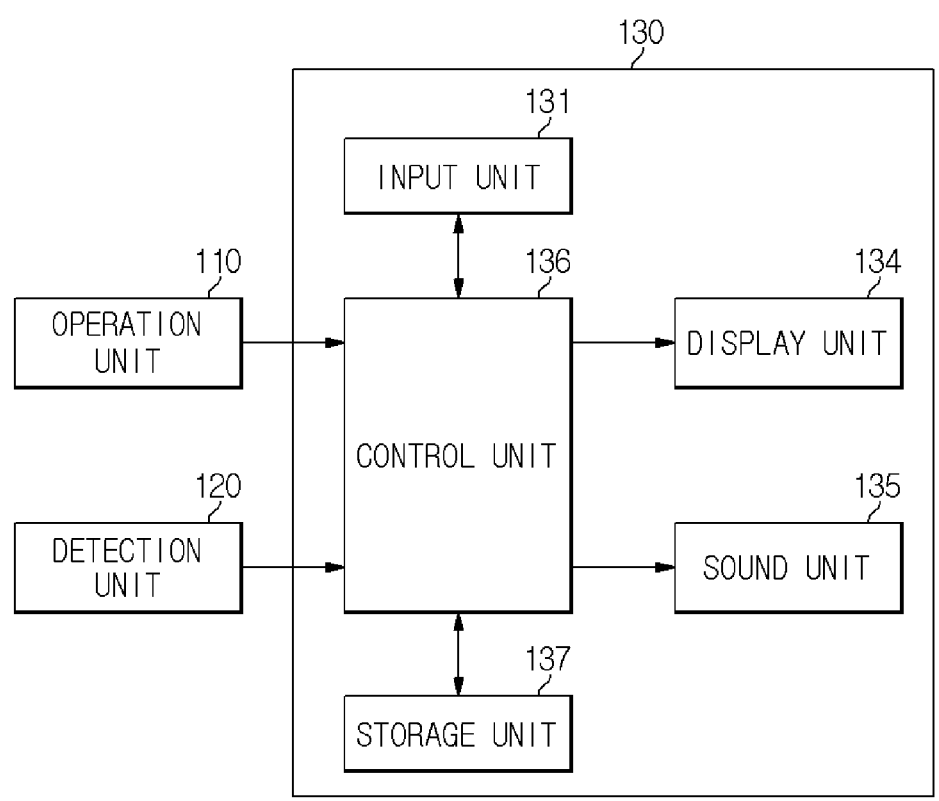
FIG. 5 is a view illustrating a control configuration of a terminal in a vehicle according to another exemplary embodiment of the present invention.

FIG. 5 is a view illustrating a control configuration of a terminal in a vehicle according to another exemplary embodiment. The terminal 130 includes an input unit 131, a control unit 136, a storage unit 137, a display unit 134, and a sound unit 135.

The terminal 130 may be one of any one of a navigation device, a hands-free device, an A/V device, a Bluetooth device, and/or a rear camera, or may be one device to perform operation modes such as vehicle driving guidance, external broadcasting output, and A/V output.

The input unit 131 may be a plurality of keys provided on a main body of the terminal 130 and a touch panel provided on the display unit. Since the input unit is identical to that of the above-mentioned embodiment, no description will be given thereof.

When an instruction for performance of the detection mode is input, the control unit 136 converts the input mode into the detection mode and controls activation of the detection unit 120. When an operation signal of the operation unit 110 is input during performance of the detection mode, the control unit 136 releases the converted detection mode from the input mode and controls deactivation of the detection unit 120.

The control unit 136 determines only a signal detected within a predetermined detection region A among the signals transmitted from the detection unit 120 as a signal indicative of movement. That is, the signal within the detection region may be identified by the magnitude of the input signal.

Figure 6:
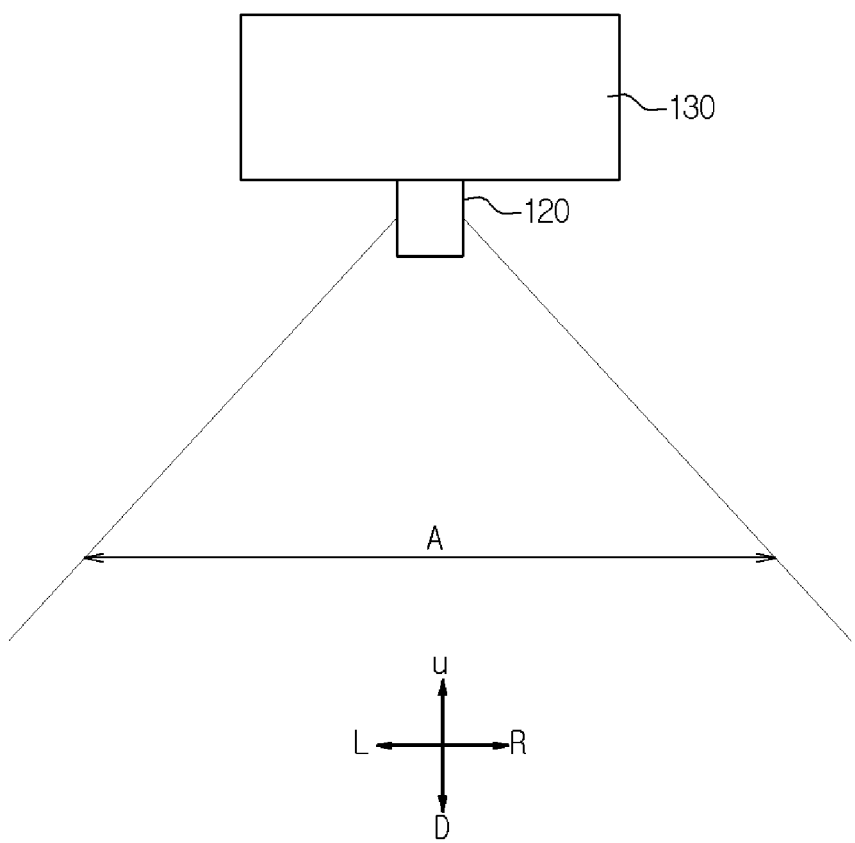
FIG. 6 is an exemplified view illustrating a detection region of a detection unit connected to the terminal in the vehicle according to another exemplary embodiment of the present invention.

Referring to FIG. 6, the detection unit 120 detects a hand located in the front thereof. In this case, the detection unit 120 has the detection region A having a certain range and outputs a signal equal to or greater than a certain magnitude during detection of the hand. Moreover, the detection unit may be provided in a plurality, thereby enabling a signal to be output along a moving direction of the hand.

The control unit 136 receives an operation instruction of the terminal through the key input or touch input of the input unit 131 during deactivation of the detection unit 120. When the movement is detected by the activated detection unit 120, the control unit 136 counts a time from a point in time at which the movement is detected, determines whether t a preset reference time has been reached, and counts the number of times of the detected movement within the reference time.

The control unit 136 identifies operation instructions corresponding to the number of times of the movement is detected and controls driving of the display unit 134 and sound unit 135 based on the identified operation instructions. For example, the control unit 136 changes the current function, controls an ON/OFF function of the operation, or performs predetermined functions. Here, the predetermined functions include menu expansion, image capture, broadcasting channel storage, etc.

When an operation instruction setting key is input to the input unit 131, the control unit 136 performs an operation instruction setting mode and generates a new operation instruction by matching the operation instructions input to the input unit 131 with the number of times of the movement is input to the input unit 131.

In addition, when the operation instruction setting key is input to the input unit 131, the control unit 136 may also perform the operation instruction setting mode, activate the detection unit 120, and generate a new operation instruction by matching the operation instructions input to the input unit 131 with the number of times of the movement detected by the detection unit 120. The control unit 136 may also control operations based on the direction of movement within the reference time, the number of times of movement, and the detection time.

The storage unit 133 stores operation instructions corresponding to the reference time and number of times of movement. The storage unit 133 may also store an operation instruction corresponding to the direction of movement and an operation instruction corresponding to the detection time. Here, the detection time is a time at which the hand is located within a predetermined detection region of the detection unit.

The display unit 134 may display information related to a telephone call, information related to playing of music, or map information related to driving and route guidance information, or may also display external broadcasting signals as an image. The sound unit 135 outputs sound related to route and driving information, music, and images.

Figure 7:
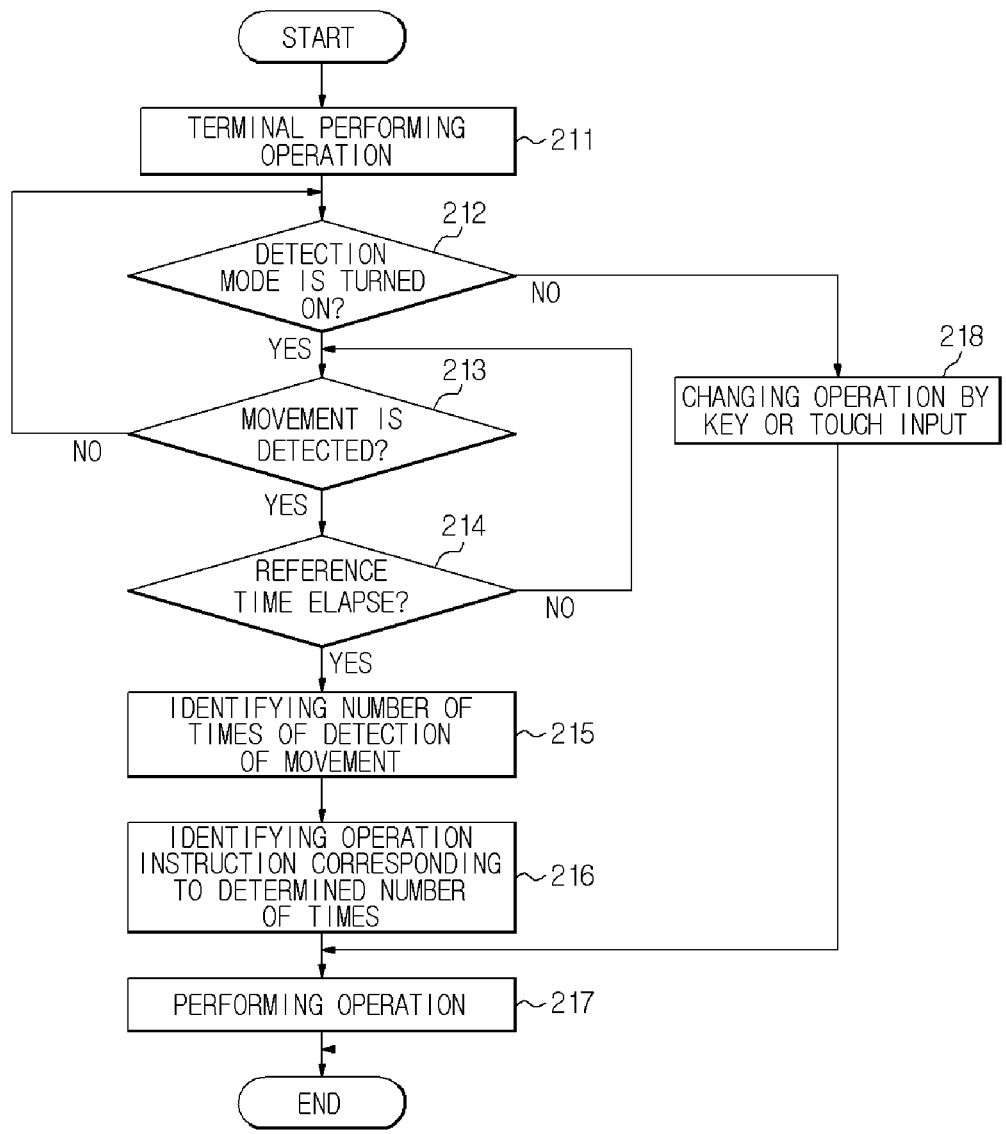
FIG. 7 is a control flowchart of the terminal in the vehicle according to another exemplary embodiment of the present invention.
Figure 8:
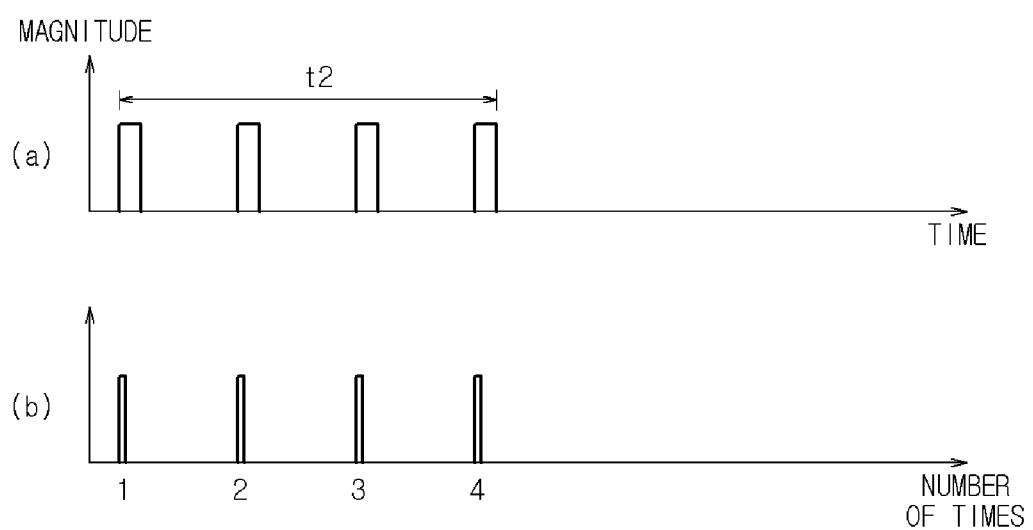
FIG. 8 is an exemplified view illustrating a count of movement of the terminal in the vehicle according to another exemplary embodiment of the present invention.

FIG. 7 is a control flowchart of the terminal in the vehicle according to another embodiment. Hereinafter, a description will be given with reference to FIG. 8. When it is determined that the detection mode is turned ON in the operation unit 110 (operation 212) while the terminal performs any one of operations in a powered state (operation 211), the terminal performs the detection mode which receives an operation instruction to control at least one of the plurality of operation modes through detection of a hand's movement. As such, the terminal transmits an activation signal to the detection unit 120.

In this case, the detection unit 120 receives the activation signal from the terminal and activates the operation. When the hand being close to the terminal is detected, the terminal outputs a high signal equal to or greater than a certain magnitude. On the other hand, when the hand being close to the terminal is not detected, the terminal outputs a low signal. In addition, the detection unit 120 may also be always activated.

In addition, the low (i.e., lesser) signal may also be output when the hand is detected whereas the high signal may also be output when the hand is not detected, according to a circuit configuration of processing detection signals of the detection unit 120. When the hand's movement is detected by the detection unit 120 (operation 213), the terminal counts a time from a point of time at which the hand's movement is detected and determines whether the counted time passes a reference time (operation 214). The terminal identifies the number of times of the movement is detected until the reference time elapses from the point in time at which the hand's movement is detected (operation 215).

As shown in FIG. 8(a), determining whether the hand's movement is detected or redetected means that the hand is determined to be close to a predetermined detection region when the high signal equal to or greater than a certain magnitude is input from the detection unit 120 whereas the hand is determined to be away from the detection region when the low signal is input from the detection unit 120. In this case, the terminal determines that the hand moves inward and outward of the detection region based on the high and low signals input from the detection unit.

As shown in FIG. 8(b), the terminal counts the number of times of the detected hand's movement before the counted time elapses at a reference time t2, and identifies the number of times of the counted movement. Next, the terminal identifies operation instructions corresponding to the number of times movement is detected (operation 216) and performs at least one of a plurality of load operations on the display unit 134 and sound unit 135 based on the identified operation instructions (operation 217). In addition, when the detection mode is not input through the operation unit 110, the terminal changes the current operation mode corresponding to the key input of the input unit or the touch input of the touch panel (operation 218) and performs the changed operation (operation 217).

As an example of the terminal control, a method of controlling operation modes of the terminal will be described. Here, it is assumed that the terminal has operation modes such as a navigation mode, a radio mode, and a DMB viewing mode.

In a state in which the terminal performs the navigation operation mode informing vehicle driving information, the terminal changes the navigation operation mode to the DMB operation mode when the movement is detected once and is then detected once again within a reference time, and changes the navigation operation mode to the radio operation mode when the movement is further detected twice.

As another example of the terminal control, a method of controlling functions of the terminal will be described. Here, it is assumed that the terminal is a navigation device and has functions such as menu expansion, image capture, and sound volume up or down.

When the terminal performs the navigation operation mode informing vehicle driving information, the terminal expands and displays the menu of the navigation device when the movement is detected once and is then detected again within a reference time, captures the current image displayed on the navigation device when the movement is further detected twice, and turns the sound volume of the navigation device up when the movement is further detected three times.

In addition, it is assumed that the terminal is an A/V device capable of viewing the DMB, an operation instruction corresponding to capture is when the movement is executed twice, and an operation instruction corresponding to channel change is when the movement is executed three times.

In a state in which the A/V device outputs external broadcasting, the A/V device counts a time from a point of time at which the movement is detected once and simultaneously counts the number of times of the detected movement until a reference time to identify the number of times of the movement is detected until the reference time expires. When it is determined that the movement is detected twice, the A/V device captures and stores the current output image.

In a state in which the A/V device outputs external broadcasting, the A/V device counts a time from a point in time at which the movement is detected once and simultaneously counts the number of times of the detected movement until a reference time to identify the number of times of the counted movement until the reference time elapses. When it is determined that the movement is detected twice, the A/V device turns the current channel up or down to change the channel.

As such, since the operation instructions of the terminal are input by an input method such as clicking or double clicking, the terminal may give intuitive and sensuous cognition to the user.

Figure 9:
FIG. 9 is an exemplified view illustrating a count of movement of a terminal in a vehicle according to a further exemplary embodiment of the present invention.
Figure 9:

FIG. 9 is an exemplified view illustrating a count of movement of a terminal in a vehicle according to a further exemplary embodiment. The control unit of the terminal identifies a detection time at which the hand is detected and an operation instruction corresponding to the detection time, and controls the display unit and the sound unit based on the identified operation instruction.

Identification of the detection time at which the hand is detected means that the hand is determined to be close to a predetermined detection region when a higher signal equal to or greater than a certain magnitude is input from the detection unit 120 whereas the hand is determined to be away from the detection region when a low signal is input from the detection unit 120. In this case, the identification of the detection time includes identification of a time at which the higher signal is input. That is, the control unit identifies a time at which the higher signal equal to or greater than a certain magnitude is input and maintained from an input point of time of the high signal.

As shown in FIGS. 9(*a*) and (*b*), the detection time may vary as t4 or t5 according to a maintained time of the high signal equal to or greater than a certain magnitude. That is, the control unit identifies a time at which the higher signal equal to or greater than a certain magnitude is maintained, compares the identified time with a pre-stored storage time to identify the identified time and a matched storage time, and determines an operation instruction corresponding to the matched storage time.

In addition, the storage unit stores an operation instruction for each storage time. For example, it is determined that a signal corresponding to a short key of a hard key is input when the detection time is a time less than one second, whereas it is determined that a signal corresponding to a long key of a hard key is input when the detection time is a time equal to or greater than one second. That is, when the signal corresponding to the short key is input, the position is changed to a next menu. When the signal corresponding to the long key is input, the menu is selected.

In addition, the terminal may also perform an operation instruction corresponding to a detection direction of movement. A description thereof will be given for example. For example, when the direction of movement is detected from the right to the left in a current state of performing the navigation mode, the current map may also slide from the right to the left.

Accordingly, it is possible to intuitively input operation instructions by means of using the sliding function considered as sensuous cognition by the user. For example, the terminal turns the channel up when the hand moves from the left to the right during output of external broadcasting, turns the channel down when the hand moves from the right to the left, turns the volume up when the hand moves from the bottom to the top, and turns the volume down when the hand moves from the top to the bottom.

Accordingly, it is possible to innovatively improve brand image by applying new technologies such as the proximity sensor to the vehicle. As is apparent from the above description, in accordance with the present invention, it may be possible to intuitively input the operation instructions of the terminal. That is, it may be possible to give cognition of the intuitive and sensuous terminal to the user since the operation instructions of the terminal are input in an input manner by operation struck with the hand two or three times such as clicking or double clicking.

In addition, various input methods of the terminal may be implemented by plural plurality of input methods such as the short key and the long key of the hard key in one detection unit. For example, it may be possible to perform a screen capture function by utilizing specific and intuitive operation such as the sliding function considered as sensuous cognition by the user and by sliding the screen with the hand. It may also be possible to innovatively improve brand image by applying new technologies such as the proximity sensor to the vehicle.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus installed in a vehicle comprising:
a terminal configured to perform at least one operation of a navigation operation, an audio/video output operation, a telephone call operation, a music playing operation, and a radio operation, and having a display unit and a sound unit, wherein information related to the at least one operation is outputted by the display unit and the sound unit;
a detector configured to detect movement of a hand of a user; and
a controller configured to:
  i) activate the detector when a detection mode is activated by the user,
  ii) activate a redetection mode for controlling the terminal when the movement of the hand is detected during the detection mode,
  iii) terminate the redetection mode when the movement of the hand is not redetected within a preset time period during the redetection mode,
  iv) count a number of times the movement of the hand is detected for a preset reference time when the movement of the hand is redetected within the preset time period during the redetection mode,
  v) identify an operation corresponding to the counted number of times the movement of the hand is detected,
  vi) control operation of the display unit or the sound unit of the terminal such that the identified operation is performed by the terminal,
  vii) determine whether the movement of the hand is moving inward and outward from a predetermined detection region based on a magnitude of signals input from the detector, and
  viii) count a number of signals among the inputted signals that have a magnitude greater than or equal to a reference magnitude, wherein the counted number of the signals includes the counted number of times the movement of the hand is detected during the redetection mode.

2. The apparatus according to claim 1, wherein the terminal comprises at least one of a navigation device, a black box, a GPS, a Bluetooth device, and a rear camera.

3. The apparatus according to claim 1, wherein the detector comprises a proximity sensor which detects the movement of the hand located in the predetermined detection region.

4. The apparatus according to claim 1, further comprising:
an input unit,
wherein the controller is further configured to activate the detector when key signals to set operation instructions are input to the input unit, and generate operation instructions by matching the number of times the movement of the hand is detected by the detector with the operation instructions input to the input unit.

5. The apparatus according to claim 4, further comprising a storage unit, wherein the generated operation instructions are stored in the storage unit.

6. A terminal which performs at least one operation mode of a vehicle driving route guidance operation mode, an external broadcasting output operation mode, and an A/V output operation mode, the terminal comprising:

a display unit and a sound unit, wherein information related to the at least one operation mode is outputted by the display unit and the sound unit;
a detector configured to detect movement of a hand of a user;
a controller configured to:
i) activate the detector when a detection mode is activated by the user,
ii) activate a redetection mode for controlling the terminal when the movement of the hand is detected during the detection mode,
iii) terminate the redetection mode when the movement of the hand is not redetected within a preset time period during the redetection mode,
iv) count a number of times the movement of the hand is detected for a preset reference time when the movement of the hand is redetected within the preset time period during the redetection mode,
v) identify an operation instruction of the terminal corresponding to the counted number of times the movement of the hand is detected, and
vi) control operation of the display unit or the sound unit based on the identified operation instruction such that the at least one operation mode is performed,
vii) determine whether the movement of the hand is moving inward and outward from a predetermined detection region based on a magnitude of signals input from the detector, and
viii) count a number of signals among the inputted signals that have a magnitude greater than or equal to a reference magnitude, wherein the counted number of the signals includes the counted number of times the movement of the hand is detected during the redetection mode; and
a storage unit, wherein the operation instruction of the terminal corresponding to the number of times the movement of the hand is detected is stored in the storage unit.

7. The terminal according to claim 6, wherein the controller is further configured to convert a current operation mode into another operation mode based on the number of times the movement of the hand is detected.

8. The terminal according to claim 6, wherein the controller is further configured to perform at least one of screen capture operation, channel storage operation, and menu expansion and reduction operation in a current mode, based on the number of times the movement of the hand is detected.

9. The terminal according to claim 6, wherein the detector comprises a proximity sensor which detects movement of the hand located in the predetermined detection region.

10. The terminal according to claim 6, wherein the controller is further configured to identify a detection time at which the movement is detected within a preset detection region and identifying an operation instruction corresponding to the identified detection time.

11. The terminal according to claim 6, wherein the controller is further configured to identify a detection direction of the movement when the movement is detected within a preset detection region and identifying an operation instruction corresponding to the identified detection direction.

12. A method of controlling a terminal provided in a vehicle, the method comprising:
activating a detector when an instruction to perform a detection mode is input to an input unit;
activating a redetection mode for controlling the terminal when the detector is activated;
terminating the redetection mode when a movement of a hand of a user is not redetected within a preset time period during the redetection mode;
counting the number of times the movement of the hand is redetected for a preset reference time when the movement is redetected within the preset time period during the redetection mode;
identifying the counted number of times the movement of the hand is detected;
identifying an operation instruction corresponding to the number of times the movement of the hand is detected;
controlling operation of a display unit and a sound unit of the terminal based on identified operation instructions by causing the display unit or the sound unit of the terminal to output information related to at least one operation of a navigation operation, an audio/video output operation, a telephone call operation, a music playing operation, and a radio operation;
determining whether the movement of the hand is moving inward and outward from a predetermined detection region based on a magnitude of signals input from the detector; and
counting a number of signals among the inputted signals that have a magnitude greater than or equal to a reference magnitude, wherein the counted number of the signals includes the counted number of times the movement of the hand is detected during the redetection mode.

13. The method according to claim 12, further comprising:
activating the detector when key signals to set operation instructions are input to the input unit;
identifying the operation instructions input to the input unit;
identifying the number of times the movement of the hand is detected by the detector;
generating a new operation instruction by matching the number of times the movement of the hand is detected with the operation instructions input to the input unit; and
storing the generated new operation instruction and the number of times the movement of the hand is detected.

14. The method according to claim 13, wherein the identifying movement detected by the detector further comprises identifying the number of times the movement of the hand is detected by the detector and a time interval between the detected movements.

* * * * *